(No Model.)
C. B. SHELDON.
PNEUMATIC TIRE.
No. 530,803. Patented Dec. 11, 1894.
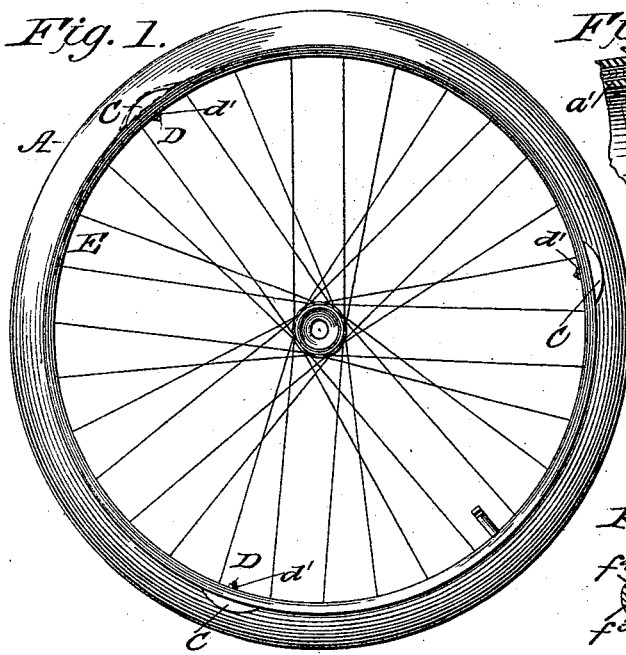
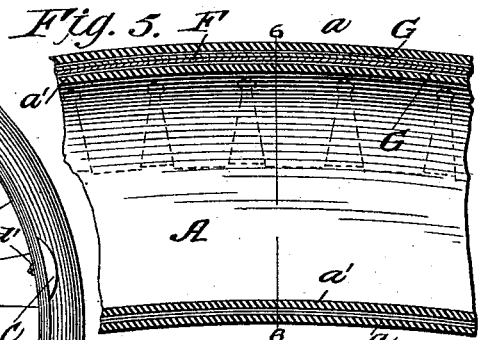
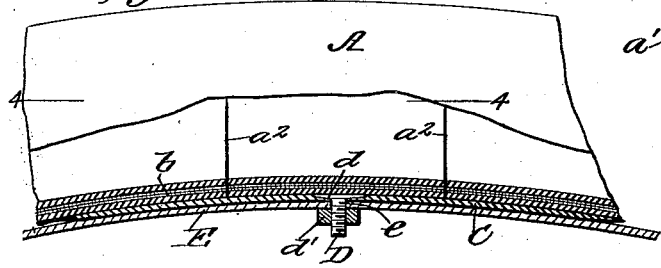
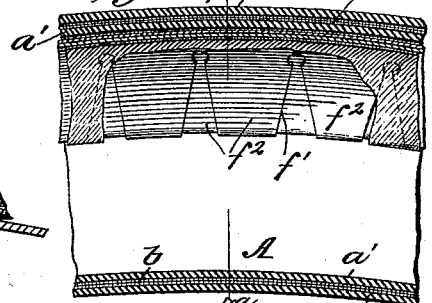
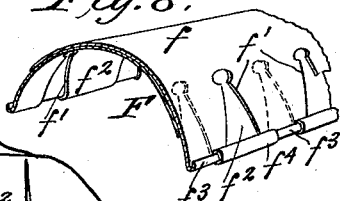
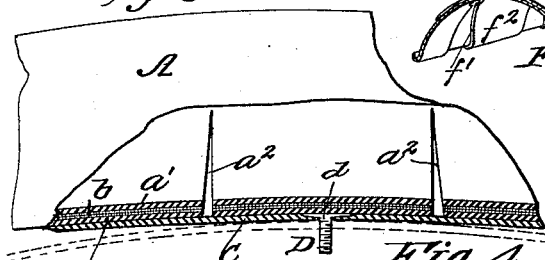
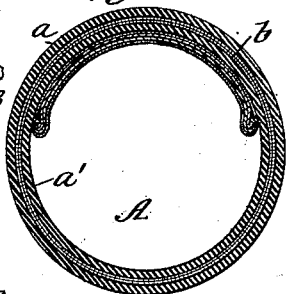
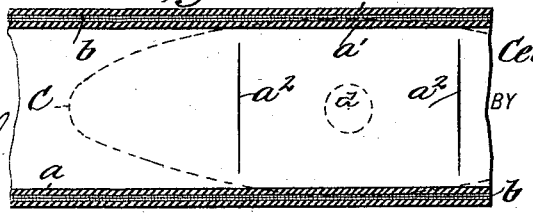
WITNESSES:
Fred G. Dieterich
A. D. Blondel
INVENTOR
Cevedra B. Sheldon.
BY Munn & Co.
ATTORNEYS.
THE NORRIS PETERS CO., PHOTO-LITHO., WASHINGTON, D. C.

UNITED STATES PATENT OFFICE.

CEVEDRA B. SHELDON, OF BROOKLYN, NEW YORK, ASSIGNOR TO LEVI W. CASE, OF MONTCLAIR, NEW JERSEY.

PNEUMATIC TIRE.

SPECIFICATION forming part of Letters Patent No. 530,803, dated December 11, 1894.

Application filed February 2, 1894. Serial No. 498,920. (No model.)

*To all whom it may concern:*

Be it known that I, CEVEDRA B. SHELDON, residing at Brooklyn, in the county of Kings and State of New York, have invented certain new and useful Improvements in Pneumatic Bicycle-Tires, of which the following is a specification.

As is well known, pneumatic tires, are generally cemented in the concave seat of the metal rim of the wheel, and when inflated, are expanded to their greatest diameter, which diameter in their manufacture, is determined to be such as to cause such tire to snugly fit the seat rim, it is intended to fit.
It is also well known, that in the use of pneumatic tire machines, the tire frequently slips from the wheel, rendering the machine for the time being useless, as the tire, when inflated cannot be sufficiently stretched, to slip over and onto such seat rim, thereby making it necessary that the tire be again cemented or refitted by an experienced bicycle repairer.

One of the main objects of my invention is to provide a pneumatic tire which, when inflated to its greatest diameter will snugly fit its metal seat rim, and yet be capable of being readily attached thereto without the aid of cement, or detached as may be desired, and in which the diameter of such tire can be sufficiently expanded, and slipped onto the rim by any one, in the same manner as the ordinary cushion tires are replaced, such expansion of the tire being effected without detracting from its flexibility or resiliency, or impairing its strength.

A further object is to provide a pneumatic tire having an improved armor means, which will render such tire proof against puncturing or penetration, and which in themselves will possess a degree of flexibility and resiliency as not to interfere with the flexibility or resiliency of the tire as a whole.

To these ends, my invention consists of a pneumatic bicycle tire constructed and arranged in the peculiar and novel manner hereinafter first described in detail and then particularly pointed out in the claims, reference being had to the accompanying drawings, in which—

Figure 1 is a side view of a bicycle wheel with my improved tire attached. Fig. 2 is a longitudinal section, partly in side view, of a portion of the tire showing it inflated and held to its contracted or normal diameter.
Fig. 3 is a similar view showing such portion stretched. Fig. 4 is a horizontal section of the same taken on the line 4—4 Fig. 2. Fig. 5 is a longitudinal section of a portion of the tire showing the armor or protecting means, in the preferred construction. Fig. 6 is a transverse section of the same on the line 6—6 Fig. 5. Fig. 7 is a longitudinal section of a portion of the tire showing a modified arrangement of the armor devices and Fig. $7^a$ is a transverse section of the same on the line $7^a$ $7^a$ Fig. 7. Fig. 8 is a detail perspective view of a portion of the armor devices detached.

Referring to the accompanying drawings, A indicates the pneumatic tire, which in its general construction, is formed of the usual outer and inner layers of rubber $a$ $a'$, and the intermediate layer of canvas $b$. At intervals, preferably at three different points as shown in Fig. 1, the under or bearing face of the tire has one or more transverse slits $a^2$ $a^2$, and at such points is secured or integrally connected, a supplemental rubber section C, of a greater elasticity than the body which not alone reinforces such portion of the tire but also, covers the slits $a^2$ $a^2$.

So far as described, it will be seen that the under face of the tire has practically, portions of a greater elasticity than the body and is thereby rendered capable of being stretched more than the outer portion. It will thus be seen that while the tire can be made to have a definite diameter to fit a corresponding annular bearing rim, its bearing face is capable of being stretched sufficiently to permit of its being readily attached to, or detached from the said rim, without affecting the clamping or wearing quality of the tire as a whole.

While the clamping quality of the tire will be sufficient to hold it to the rim, I prefer to employ the additional means, shown most clearly in Figs. 1, 2 and 3, by reference to which it will be seen, from the supplemental rubber portions are projected inwardly, bolts D, which have beveled heads $d$, embedded in such rubber portions at points between the slits $a^2$ $a^2$, which bolts are adapted to pass through apertures $e$ in the rim E, nuts $d'$ being provided to secure such bolts to the rims as shown.

A tire constructed to have its inner portion capable of being stretched at one or more points more than on its outer periphery, can be readily slipped on the tire by any one, and fitted thereto without collapsing it as is now the usual custom in refitting tires. Furthermore the rider can at any time for any desired cause quickly remove or replace such tire without the aid of any particular tool or tools.

The armor device consists of a pair of plates, an inner one F and an outer one F' which are adapted to extend entirely around the tire, they being formed preferably of very thin but hard tempered steel, whereby to have a proper resiliency.

Each plate it will be noticed, has a central longitudinal bearing portion $f$ and a series of laterally extended slots or notches $f'$, whereby a series of spring fingers $f^2$ are provided, and the two plates are so arranged relatively that the fingers will project alternately and lap, so that the fingers on the under plate will be under the slots $f'$ of the outer plate F. By this construction it will be observed, that, while the armor will possess all the required flexibility, it presents a substantial solid face to the bearing portion of the tire, so that no matter where it may be punctured, it will act as a safety or restraining portion to protect the inner rubber or canvas portion.

To interlock the two plates, and also to protect the rubber portions of the tire from cutting edges, such plates have the ends of their lateral fingers terminating in upturned or bead like portions $f^3 f^4$, the lower ones $f^4$, of which curve over the upper ones $f^3$ as shown most clearly in Fig. 8. These armor plates in newly constructed tires are preferably embedded within the outer rim of such tire, as shown in Figs. 5 and 6, surrounded by an outer and inner canvas covering G, but when fitted into tires already in use or finished, such armor is held within the rubber tubing; it (the armor) being entirely covered by an inner and outer canvas covering.

It should be stated that when embedded in the rubber, such armor will not perceptibly increase the thickness thereof, and by having its lateral fingers terminating in bead like portions, no sharp projections or ridges will be produced which might in time cut the rubber. It will be readily seen that by constructing a tire as described, no special skill or tools will be required to insert the armor within in a tire, nor will any special means whatever be required to set, or remove such tire from the rim.

Having thus described my invention, what I claim, and desire to secure by Letters Patent, is—

1. An improved pneumatic bicycle tire, having its tread face practically non-expansible longitudinally, and a seat portion having one or more portions longitudinally expansible, when the tire is inflated, and fastening devices secured to the said seat portion, all arranged substantially as shown and described.

2. A pneumatic tire formed of a tubular body having at intervals transverse slits, in its seat portion and supplemental portions of a greater elasticity than such body portions secured to such body and extended over the said slits, all arranged substantially as shown, whereby the under or seat portion will be capable of longitudinal expansion when the said tube is inflated to its greatest diameter all arranged substantially as and for the purposes described.

3. A pneumatic bicycle tire, formed of a tubular body of the same thickness throughout, having at intervals one or more transverse slits in its under face, and supplemental portions secured on the outer face of the tube over the slits, of a greater elasticity than the main or body portion, whereby such tube can be stretched longitudinally at such slitted portions without changing the condition of the outer or tread portion of such tube as set forth.

4. As an improvement in pneumatic tires for bicycles, the combination with the tire having its under or seat face formed with one or more portions of greater elasticity than the remaining portions, such greater elastic portions having fastening devices secured thereto, whereby the tire can be fastened to the rim substantially as shown and described.

5. An improved pneumatic bicycle tire, having one or more transverse slits in its seat face, a supplemental portion integrally formed therewith extended over such slits and a fastening bolt having its head embedded between the supplemental portion and the body substantially as shown and described.

6. An improved bicycle tire, having at intervals a pair of transverse slits and a supplemental portion integrally formed therewith extended over such slits, and a fastening bolt having its head embedded in the supplemental portion at a point between the said slits all arranged substantially as shown and described.

7. A pneumatic tire for bicycles having an armor formed of a thin continuous plate formed with a solid longitudinal bearing face and a series of lateral curved fingers having their ends terminating in turned up or bead like portions, whereby such ends as they are expanded will be prevented from cutting the tire body as set forth.

8. A pneumatic tire for bicycles, having an armor formed of two thin continuous plates having lateral fingers, said plates being held one under the other, with the fingers of the inner one arranged under the spaces between the upper fingers substantially as shown and described.

9. A pneumatic bicycle tire having an armor formed of a pair of thin plates having lateral fingers or projections, held to lap each other and interlock substantially as shown and for the purposes described.

10. A pneumatic bicycle tire having an armor formed of a pair of thin plates having each a continuous outer or bearing portion, and lateral fingers, held to lap and projected to form a continuous metal deflecting portion, said fingers having turned up or bead portions joined as and for the purposes described.

11. An armor for pneumatic bicycle tires comprising a pair of plates having each a continuous solid longitudinal or bearing portion and lateral fingers, the fingers of one overlapping the spaces between the fingers of the other, and a canvas or analogous covering for such armor plates all substantially as shown and described.

CEVEDRA B. SHELDON.

Witnesses:
FRED G. DIETERICH,
PERRY B. TURPIN.